Aug. 14, 1923.
1,464,844
C. R. DOWNS
SUBLIMATION PROCESS
Filed July 2, 1919
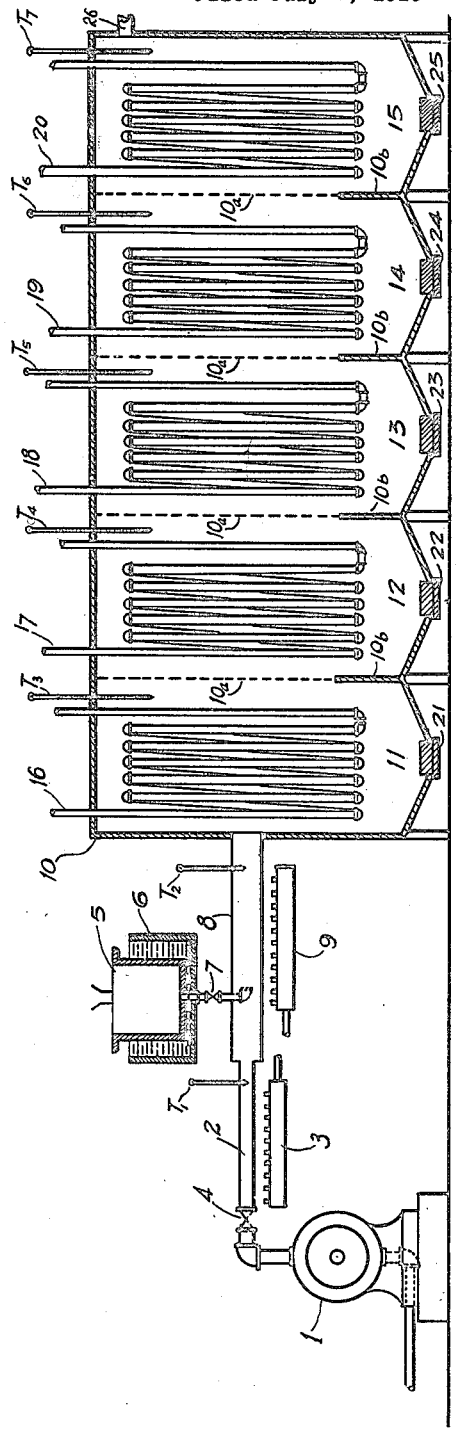
INVENTOR
Charles R. Downs
BY
Chas. W. Mortimer
ATTORNEY Patented Aug. 14, 1923.

1,464,844

UNITED STATES PATENT OFFICE.

CHARLES R. DOWNS, OF CLIFFSIDE, NEW JERSEY, ASSIGNOR TO THE BARRETT COMPANY, A CORPORATION OF NEW JERSEY.

SUBLIMATION PROCESS.

Application filed July 2, 1919. Serial No. 308,308.

*To all whom it may concern:*

Be it known that I, CHARLES R. DOWNS, a citizen of the United States, residing at Cliffside, in the county of Bergen and State of New Jersey, have invented certain new and useful Improvements in Sublimation Processes, of which the following is a specification.

This invention relates to a process of purifying materials that can be readily sublimed. By this invention a mixture of two or more of such materials may be separated into fractions, each one of which fractions may consist of a compound that is relatively or entirely free from the presence of other compounds. The process has proven most satisfactory in the treatment of mixtures of materials which sublime at widely different temperatures and do not have the property of forming mixed crystals.

The invention will be specifically described in connection with the purification of anthraquinone and also in connection with the purification of phthalic acid anhydride but it is to be understood that the invention is not restricted to the treatment of these particular materials. Other materials having properties similar to the ones in connection with which the invention will be described may be successfully treated according to this invention with satisfactory results.

By using the old and well-known methods for producing anthraquinone by the oxidation of anthracene it has been found that impurities or by-products are produced which become mixed with the anthraquinone. In such treatment anthracene is usually oxidized to produce anthraquinone by using an oxidizing agent such as sodium or potassium dichromate and dilute acid. The impure anthraquinone which is produced is filtered from the waste chromate liquors, dried and heated in a vessel while super-heated steam is preferably blown through the mass in order to assist the sublimation of the anthraquinone. The anthraquinone vapor mixed with the steam is then carried into a receiving chamber where the condensable materials are condensed by means of a spray of water. A screen in the bottom of the container catches the crystals and permits the surplus liquid to drain off. It is then necessary to dry the crystals before they can be further used, for example, for sulfonating the same to produce alizarine. The crystals of anthraquinone produced in this way are exceedingly light and fluffy so that they occupy a very large volume and are so light that care must be taken in order to prevent loss of the same by being carried away by gusts of air. Also impurities or other by-products condensed from the vapors are mixed with the anthraquinone crystals. For example, unoxidized anthracene is apt to be mixed in somewhat large percentages with the anthraquinone.

When naphthalene is oxidized to produce phthalic acid, the same sorts of difficulties are experienced as by-products or impurities are carried along with the vapors and condensed and become mixed with the phthalic acid anhydride crystals. At the same time the phthalic acid crystals are very small, consequently requiring care in handling to prevent loss of the same.

Recently, processes have been developed by which anthracene and naphthalene can be oxidized in the vapor phase by means of an oxygen containing gas in the presence of suitable catalyzers so as to produce large yields of anthraquinone and phthalic acid anhydride, respectively. In these processes as practiced at present appreciable amounts of by-products are also formed as in the old processes, which by-products are found mixed with the final product and render the same impure.

By this invention the difficulties and objections of prior processes are largely overcome and compounds are produced, usually in large crystals, which are relatively free from the presence of objectionable impurities. In practicing this invention the impure material, such as anthraquinone or phthalic acid or anhydride, or other materials, are first vaporized and the vapors are condensed so that large crystals of comparative purity may be directly obtained from the vapors. The vapors from the materials treated may be carried by means of air or a neutral gas into a container having separate compartments which are maintained at different temperatures so that a portion of the vapors consisting largely or entirely of one compound is condensed in one chamber and another portion is condensed in another chamber maintained at a different temperature.

In the practice of this invention the crude product to be purified is sprayed in a melted condition into a chamber maintained at a predetermined temperature where it is met by and intimately mixed with a stream of a neutral, fixed gas which has been preheated to the same temperature. This gas then becomes saturated with the vapors of the compound which is to be produced in a pure condition. These vapors then pass into a zone which is held at such a temperature that the gas is slightly supersaturated with the vapors of one of the compounds whereby fractional condensation takes place and this compound crystallizes from the vapor form in large pure crystals. The residual mixed gas and vapors then pass onto a zone whose temperature is still lower and again the gas becomes supersaturated with the vapors of the compounds and further crystals result. To obtain an optimum separation of impurities from the material desired, it is advisable to construct the fractional condenser with a large number of zones wherein the temperature gradient drops slowly from the entrance to the outlet.

A specific illustration of the invention is by the sublimation of impure anthraquinone containing some anthracene and phthalic acid. The impure material is sprayed into a chamber at a tempreature of from 280° C. to 300° C. and there mixed with a stream of hot air. The mixed vapors then pass into the first compartment held at bout 200° C. Large needle like crystals of anthraquinone as much as 2 inches in length are obtained with a purity of at least 99% and free from phthalic acid. The vapors then pass through other compartments of successively lower temperatures and substantially pure anthraquinone separates because the gases are supersaturated with the vapors of anthraquinone at that temperature and not with the vapors of anthracene and phthalic anhydride. In the later compartments mixtures of phthalic anhydride and anthracene containing some anthraquinone are deposited which may be rerun to regain a large proportion of the anthraquinone or may be purified by well known chemical means.

As a further illustration of this invention it was found that in the purification of phthalic acid anhydride by this process, commercial phthalic acid containing benzoic acid, maleic acid, naphthaquinone and naphthalene was vaporized and the vapors treated in a manner similar to that above described in connection with anthraquinone. While operating with phthalic acid (or phthalic acid anhydride) the temperature of vaporization was held at about 200° C. and the temperature of the first chamber was maintained at about 94° C. Crystals of phthalic acid anhydride were obtained about a foot in length practically free from the presence of by-products or other impurities.

An apparatus which has proven successful in the practice of this process is illustrated in the accompanying drawing which is a view partly in section. Other apparatus may obviously be used in practicing this process, or the apparatus illustrated may be modified in detail without departing from the spirit and scope of the invention as defined in the appended claims.

In the drawing reference character 1 refers to a pump or fan for blowing air or a neutral gas into the apparatus through a connection 2. The air or gas is heated to the proper temperature in pipe 2 by means of the heater 3. This temperature is indicated by the thermometer $T_1$. A valve is shown at 4 for regulating the amount of air or gas. The material to be treated is placed in a vessel 5 where it is maintained in a melted condition at the proper temperature by means of a heater 6, which in the case shown is a fluid bath. From this container 5 it is allowed to flow into the chamber 8 in a regulated manner by means of the valve 7. The air or gas and material to be vaporized, preferably in an atomized condition, are intimately mixed in chamber 8 at the proper temperature as indicated by the thermometer $T_2$ by the heater 9. The mixed vapors and air or gas thence pass into the first compartment 11 of the condenser and thence successively through the compartments 12, 13, 14 and 15 which are divided from each other by means of the woven or perforated screens $10^a$. Below the screens $10^a$ are the solid walls $10^b$ which act to form receiving chambers for the deposited crystals. The function of the screens $10^a$ is to prevent any crystals which have separated while in suspension in the gas stream in a compartment from being carried over into the next one. By this method the pure crystals are not allowed to become subsequently contaminated. The screens also act in preventing heat from being radiated from one compartment to the cooling grid of the next thereby facilitating independent temperature control in each compartment. In each compartment are the cooling coils or grids 16, 17, 18, 19 and 20 by means of which the temperature in each compartment may be accurately controlled as indicated by the thermometers $T_3$, $T_4$, $T_5$, $T_6$, and $T_7$. By this means a uniform temperature drop throughout the length of the condenser may be obtained and the degree of supersaturation of a vapor in a gas in any specific compartment may be controlled. In this way, pure crystals of the desired product may be separated from the gas, whereby they are deposited at the bottom of the compartment and are removed through doors 21, 22, etc. The fixed residual gases pass out of the last compartment throught the outlet 26.

It will be obvious that instead of vaporizing impure anthraquinone or phthalic acid as above described and separating the crystals by fractional condensation, the mixed gases coming from the catalytic oxidation processes above mentioned may be subjected to fractional condensation by cooling them gradually in a series of steps thereby obtaining larger crystals and a more perfect separation than has hitherto been done.

When a large volume of air or gas carries the vapors into the condenser it becomes necessary to maintain the compartments of the condenser at correspondingly lower temperatures from those cited above, in order for the crystals to become precipitated.

By having a succession of chambers in the condenser each one maintained at the proper temperature it is possible to effect a large increase in the appropriate content of material precipitated in the individual chambers.

I claim:

1. The process which comprises subliming a mixture containing a polynuclear aromatic hydrocarbon and an oxidation product of the same in a hot gas and slowly cooling the mixture in successive stages.

2. The process which comprises subliming a mixture containing a polynuclear aromatic hydrocarbon and an oxidation product of the same in a hot gas, passing the gas containing the mixture into a cooling zone where one of the substances is crystallized and separated and subsequently cooling the gas carrying the remainder of the mixture to a lower temperature.

3. The process which comprises subliming a mixture containing a polynuclear aromatic hydrocarbon and an oxidation product of the same in a hot neutral gas and subjecting the same to fractional condensation.

4. The herein described process which comprises maintaining a gaseous mixture containing anthracene and anthraquinone vapors for a considerable period of time at a temperature of about 200° C.

5. The process of purifying crude anthraquinone which comprises subliming it and then subjecting the vapors to a temperature of about 200° C. until anthraquinone crystallizes.

6. The process of purifying crude anthraquinone which comprises subliming it and then subjecting the vapors to a temperature of about 200° C. until anthraquinone crystallizes, and subjecting the remaining vapors to a lower temperature.

In testimony whereof I affix my signature.

CHARLES R. DOWNS.